US008498316B2

(12) United States Patent
Karpushko

(10) Patent No.: US 8,498,316 B2
(45) Date of Patent: Jul. 30, 2013

(54) INTRA-CAVITY SECOND HARMONIC GENERATION (SHG) LASER DEVICE

(76) Inventor: Fedor Karpushko, München (DE)

( * ) Notice: Subject to any disclaimer, the term of this patent is extended or adjusted under 35 U.S.C. 154(b) by 125 days.

(21) Appl. No.: 13/217,858

(22) Filed: Aug. 25, 2011

(65) Prior Publication Data

US 2012/0051375 A1 Mar. 1, 2012

(30) Foreign Application Priority Data

Aug. 25, 2010 (EP) ..................................... 10173991

(51) Int. Cl.
*H01S 3/10* (2006.01)

(52) U.S. Cl.
USPC .................... 372/22; 372/21; 372/33; 372/99

(58) Field of Classification Search
USPC ............................................... 372/21–22, 33
See application file for complete search history.

(56) References Cited

U.S. PATENT DOCUMENTS

| 7,248,618 | B2 | 7/2007 | Volodin et al. |
| 2006/0280219 | A1* | 12/2006 | Shchegrov ....................... 372/99 |
| 2011/0194172 | A1* | 8/2011 | Esteban Martin et al. .... 359/330 |

OTHER PUBLICATIONS

Koechner, Walter "Solid-State Laser Engineering" Sixth Revised and Updated Edition (2006) pp. 618-624.
Jacobsson, Bjorn, et al. "Single-longitudinal mode Nd-laser with Bragg-grating Fabry-Perot cavity" Optics Express, vol. 14, No. 20 (2006) pp. 9284-9292.

* cited by examiner

Primary Examiner — Dung Nguyen
(74) Attorney, Agent, or Firm — Occhiuti Rohlicek & Tsao LLP

(57) ABSTRACT

A laser device for intra-cavity frequency conversion, in particular, for the second harmonic generation, the device comprising a laser cavity, formed by the first and the second laser cavity end reflectors wherein the said laser cavity end reflectors are highly reflective for the radiation about the laser fundamental frequency and as such provide for a predetermined level of circulating inside the cavity fundamental frequency power; an active medium provided within the said laser cavity; at least one non-linear crystal, in particular, for the second harmonic generation provided within the same laser cavity; tuning means adapted for tuning at least one of laser cavity end reflectors; wherein at least one of the laser cavity end reflectors comprises an interferometric layout providing spectrally selective reflection for the radiation about the laser fundamental frequency with the value of reflectivity nearly to 100% within a spectral range close to the free spectrum range of the laser cavity and with a sufficiently lower reflectivity outside the above spectral range such that the laser cavity restricts the spectrum of the laser radiation to a single longitudinal mode.

22 Claims, 11 Drawing Sheets

INTRACAVITY SHG LASER SET-UP

INTRACAVITY SHG LASER SET-UP
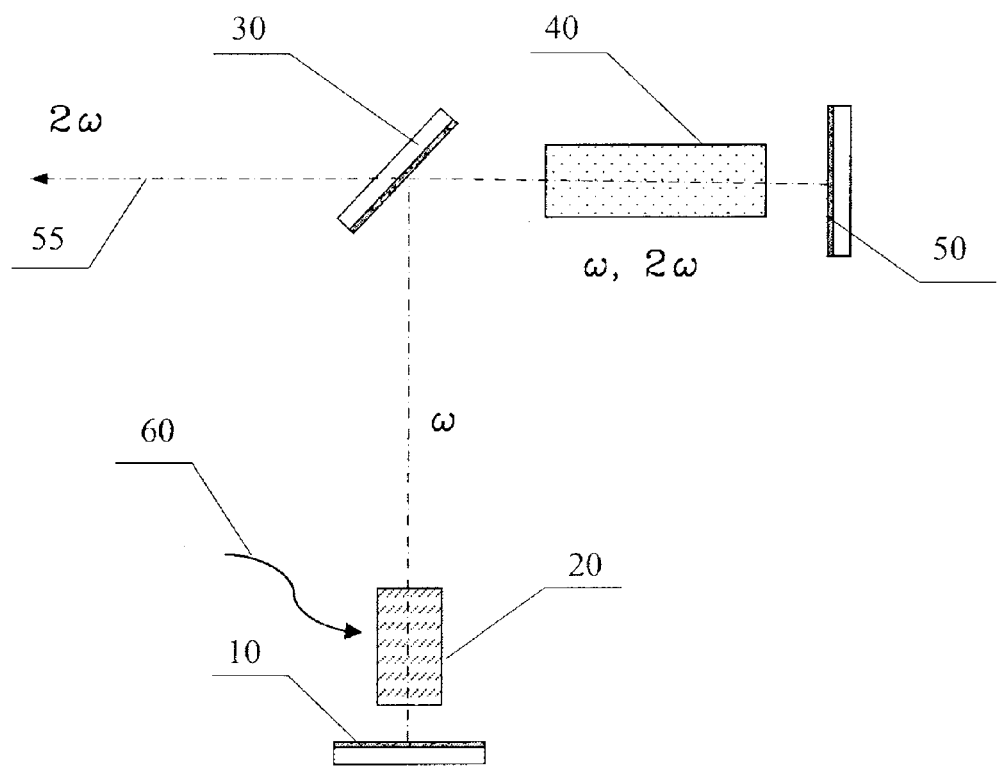
FIG. 1 - PRIOR ART

INTRACAVITY SHG LASER SET-UP
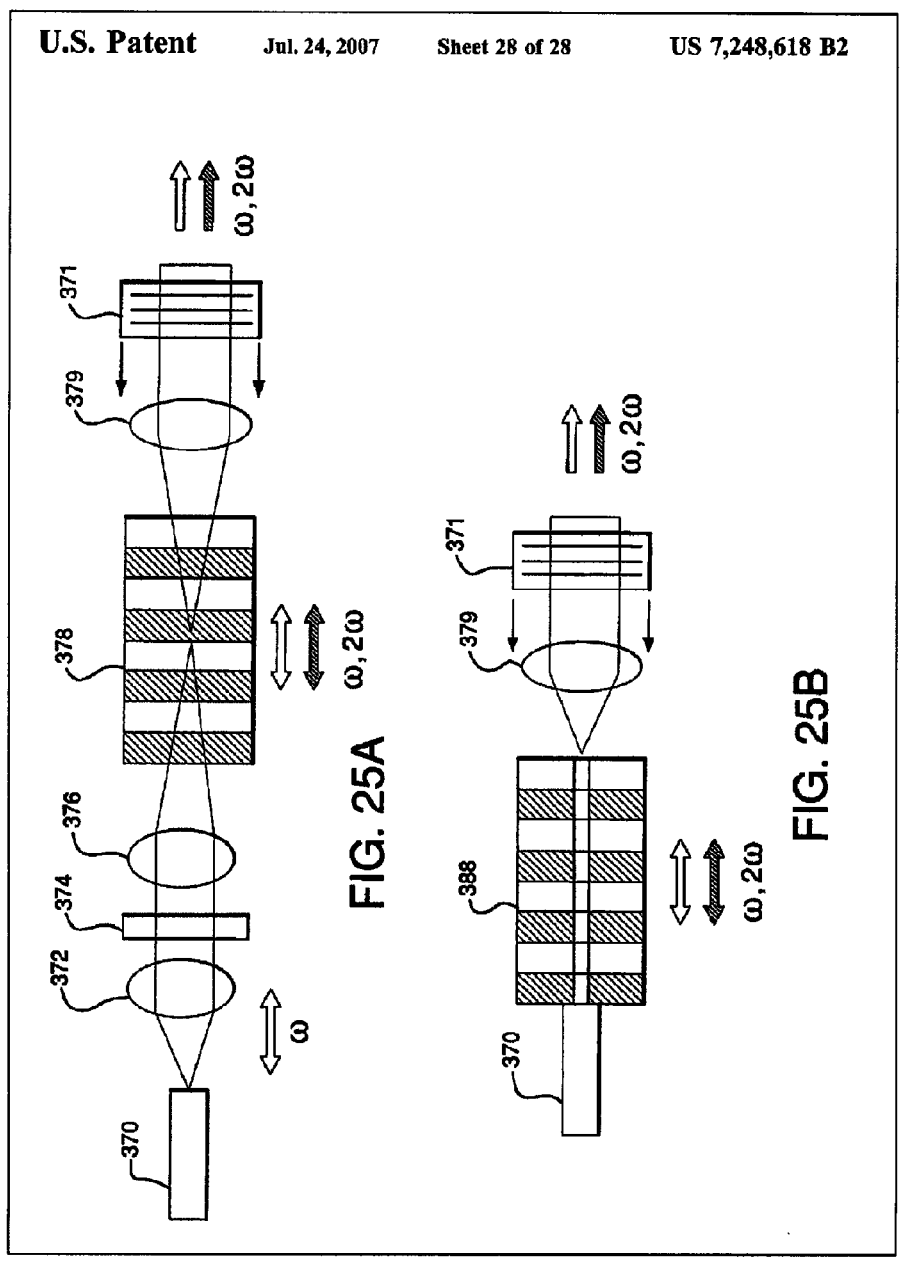
FIG. 1A – PRIOR ART (from US 7,248,618)

INTRACAVITY SHG LASER SET-UP

INTRA-CAVITY SECOND HARMONIC GENERATION (SHG) LASER DEVICE

CROSS-REFERENCE TO RELATED APPLICATIONS

This application claims the benefit of European Patent Application No. 10173991.0, filed Aug. 25, 2010, the entire disclosures of which is herein incorporated by reference.

FIELD OF THE INVENTION

The present invention relates to frequency conversion of laser radiation by means of non-linear interaction of the electromagnetic radiation with a suitable nonlinear optical medium. In particular, the invention relates to an intracavity Second Harmonic Generation (SHG), also called frequency doubling, laser device.

In a SHG process, the efficiency of the conversion of laser power at a fundamental frequency into power at the second harmonic frequency is strongly dependent on the intensity of radiation applied to the nonlinear optical material employed for the frequency conversion. Known nonlinear optical materials may require interacting intensities within a range of $10^6$ to $10^9$ W/cm$^2$ for achieving practically significant conversion efficiencies.

Obtaining sufficient interaction intensities for a frequency conversion process can be particularly critical in the case of continuous wave lasers having a moderate power, since continuous wave lasers provide a lower intensity of laser radiation than pulsed lasers.

Previously, it has been proposed to place a nonlinear optical crystal within the laser cavity, where the radiation power at fundamental frequency circulating through the nonlinear crystal may be by factor of ten's or even hundred's times higher as compared with the power available as the output from the same laser. Such schemes are described, for example, in W. Koechner, "Solid-State Laser Engineering", Sixth Revised and Updated Edition, Springer-Verlag, 2006. This approach, however, has specific issues associated therewith that may limit the efficiency of the frequency conversion and the spectral and temporal characteristics of the laser output. In particular, because of a competition among the laser cavity eigenmodes the radiation process is chaotically switching between different modes at the laser fundamental frequency. Due to a nonlinear interaction this chaotic behavior of the laser is even stronger exposed at the second harmonic frequency resulting in a noisy laser output (so-called "green-noise") that limits number of practical application.

To eliminate the "green-noise" feature in an intracavity SHG arrangement the laser needs to operate at a single longitudinal mode of the cavity, when all but one of laser cavity eigenmodes are prevented from lasing by introducing spectrally selective losses. In practice, however, placing a spectral selector inside the laser cavity leads to a decrease of the radiation power circulating through the nonlinear crystal, hence the efficiency of SHG also decreases.

In U.S. Pat. No. 7,248,618 B2 it has been proposed to introduce a spectral selectivity to the external cavity of a laser diode based SHG arrangement by using a volume Bragg grating (VBG) recorded in a photo-thermo-refractive glass, as one of the laser cavity end reflectors. With nearly 100% spectral peak reflectivity of a VBG this approach eliminates a decrease of circulating inside the cavity power at the laser fundamental frequency, however, it remains restrictive with concern to a single longitudinal mode selection when applied to the lasers of practical use for the intracavity SHG.

As shown in B. Jacobsson, V. Pasiskevicius, and F. Laurell, "Single-longitudinal mode Nd-laser with a Bragg-grating Fabry-Perot cavity", OPTICS EXPRESS, Vol. 14, No. 20, 9284-9292 (2006), the laser output spectrum remains a single longitudinal mode for the cavity lengths shorter than ≈4 mm. This is because for only such short cavities the laser cavity intermode spectral spacing, also called as the free spectrum range (FSR) of the cavity, is wide enough as compared with a reflecting VBG spectral selectivity, to satisfy a single longitudinal mode of operation. However, to accommodate a SHG nonlinear crystal of a practical significance additionally to a active laser crystal within such a short cavity is just not feasible.

SUMMARY OF THE INVENTION

It is, therefore, an object of the present invention to present a laser setup with increased spectral selectivity that allows for a single longitudinal mode operation of a laser with prolonged cavity length, hence, providing enough room within the laser cavity for placement of a SHG nonlinear crystal(s) and additional intracavity components, as reasonable According to the present invention, this object is achieved by a laser device comprising a laser cavity formed by the first and the second laser cavity end reflectors, wherein at least one of the laser cavity end reflectors comprises an interferometric layout that provides a high spectral selectivity for selecting a SLM operation in the cavities of an extended length. The apparatus further comprises an active medium, at least one nonlinear crystal for intracavity second harmonic generation and tuning means adapted for tuning at least one of the cavity end reflectors.

In one embodiment the interferometric layout forming the at least one of the laser cavity end reflectors is configured as a Michelson interferometer, wherein the interferometer reflecting elements are multilayer dielectric mirrors highly reflective about the laser fundamental frequency, and the Michelson interferometer beamsplitter has a nearly 50% reflectivity about the laser fundamental frequency. In another embodiment for a Michelson interferometer layout forming the at least one of the laser cavity end reflectors, the second interferometer reflecting element is a volume Bragg grating (VBG) having its nearly to 100% spectral peak reflectivity about the laser fundamental frequency.

The optical path difference between two branches of the Michelson interferometer is chosen such as to narrow the spectral range of the nearly 100% reflectivity of the at least one of the laser cavity end reflector below its threshold value that tolerates to switch the laser from a single longitudinal mode operation to a multi longitudinal mode regime.

In another embodiment, the interferometric layout forming the at least one of the laser cavity end reflectors is configured as a Fabry-Perot interferometer at normal incidence, wherein the first Fabry-Perot interferometer reflecting element is a multilayer dielectric mirror partially reflecting/transmitting about the laser fundamental frequency, and the second Fabry-Perot interferometer reflecting element is a volume Bragg grating (VBG) partially reflecting/transmitting at its spectral peak reflectivity about the laser fundamental frequency, furthermore the value of reflectivity of the first Fabry-Perot reflecting element about the laser fundamental frequency is chosen close to the value of the spectral peak reflectivity of VBG.

The optical path between the first Fabry-Perot reflecting element and the VBG is chosen such as to narrow the spectral range of the nearly 100% reflectivity of the at least one of the laser cavity end reflector below the spectral range threshold value that tolerates to switch from a single longitudinal mode operation to a multi longitudinal mode regime.

An advantage of making at least one of laser cavity end reflectors like Michelson or Fabry-Perot interferometric layouts incorporating a volume Bragg grating is that such layouts, starting from a selectivity of the VBG, further increase the spectral selectivity of the laser cavity end reflector without introducing an additional loss to the cavity. Hence, the laser is capable to operate in single longitudinal mode regime with reasonably long laser cavity (over 100 mm) providing a freedom for placing a nonlinear crystal of an optimal size and geometry for maximizing the SHG efficiency.

In some embodiments, the laser cavity may incorporate a focusing means, for example, a lens to form a desired transverse structure of the laser beam, and/or polarization selective elements, for example, Brewster plates and/or cavity loss modulators as used, for instance, for Q-switching.

In some other embodiments, in order to output the generated second harmonic beam in desired direction, the laser cavity may incorporate additional mirrors or beamsplitters which reflectivity about the laser fundamental frequency and about the second harmonic frequency are chosen appropriately and in accordance with the reflectivity of the components of the laser cavity end reflector comprising an interferometric layout.

In some embodiments, the laser device tuning means consists of at least one piezoelectric actuator to control the position of at least one of the elements of the laser cavity end reflector, and an appropriate photo-electric feedback circuit that produces a controlling electrical signal being applied onto the piezo-electric actuator. This provides for a fine tuning the laser cavity longitudinal mode structure and for stabilization of the laser output power.

In some other embodiments, in order to firmly lock the lasing single longitudinal mode frequency to a highly stable spectral position of the VBG selectivity peak, the photo-electric feedback signal is originated by reflecting a small portion of the laser radiation at the fundamental frequency from the VBG end that is on the opposite side to the laser cavity, while the reflecting angle differs from the normal incidence but is still on a slope of the VBG spectral selectivity peak within its angular acceptance.

BRIEF DESCRIPTION OF THE DRAWINGS

Embodiments of the present invention will now be described, by way of example only, with reference to the attached figures, in which:

FIG. 1 shows a known art laser cavity layout commonly used for intracavity SHG;

FIG. 1A shows another known art intracavity SHG laser layout using a VBG;

FIG. 6A illustrates the relation between the cavity longitudinal mode structure and the spectral selectivity of one of the laser cavity end reflectors for a single longitudinal mode operation according to yet still another embodiment of the present invention.

DESCRIPTION OF EXEMPLARY EMBODIMENTS

Figure 1B:
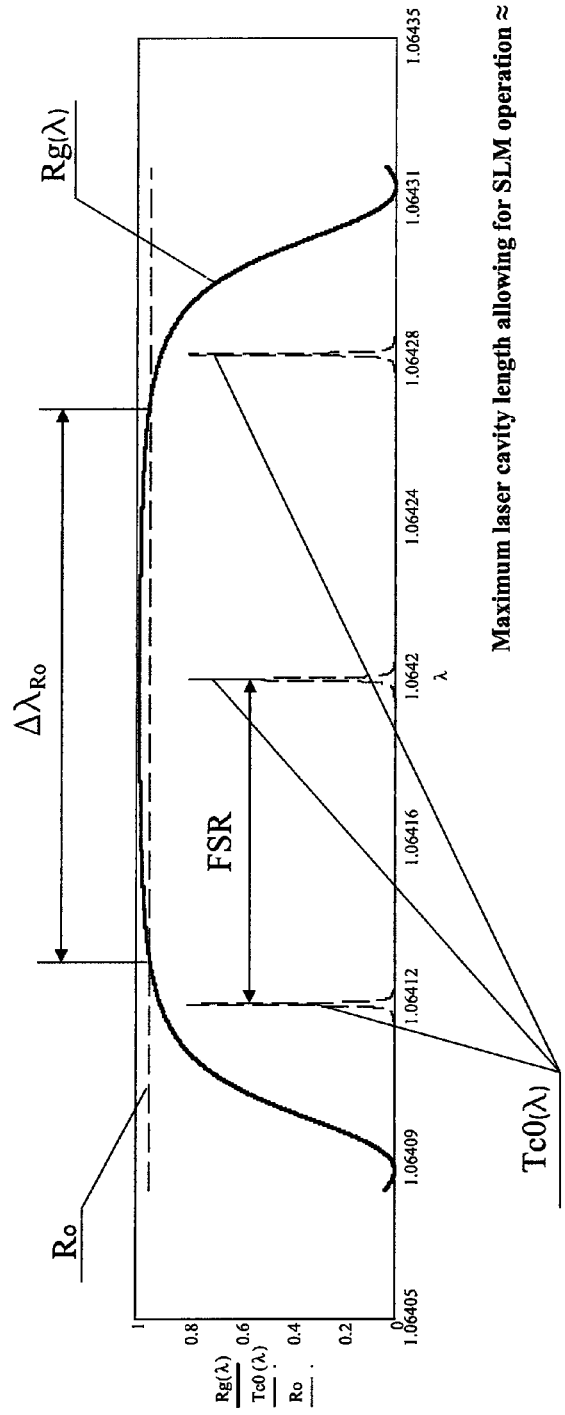
FIG. 1B illustrates the known relation between the cavity longitudinal mode structure and the spectral selectivity of a VBG for a single longitudinal mode operation.

FIG. 1 shows a layout of laser cavity principal components previously suggested for intracavity frequency doubling, where the first cavity end reflector 10, active (laser gain) medium 20, nonlinear crystal 40, and the first cavity end reflector 50 comprise a linear type laser cavity, folded by the cavity folding mirror 30 for allowing unidirectional extraction of the power at frequency 2ω (second harmonic). The waved arrow 60 indicates that an appropriate excitation of the active medium 20 is provided. In such a layout all the cavity mirrors 10, 30, and 50 are made highly reflective about the laser fundamental frequency ω. Commonly to keep the cavity loss at minimum the reflectivity of these mirrors are made as close to 100% as technologically possible by mirror manufacturers. For uni-directional laser output the mirror 50 is also made highly reflective at the second harmonic frequency 2ω, while the folding mirror 30 is made as transmissive as possible at frequency 2ω. Due to a nearly 100% reflectivity of the cavity mirrors about the laser fundamental frequency the cavity resonates and enhances the circulating laser power at frequency ω. Power at the second harmonic frequency 2ω, being a combined frequency generated by nonlinear interaction within the crystal 40, is ejected from the cavity through the folding mirror 30, as indicated by the arrow 55, after each roundtrip passing through nonlinear crystal 40.

In this scheme, however, no spectral selection is provided to the laser cavity and, hence, the laser operates in a chaotic multi longitudinal mode regime that makes the output power with excessive temporal and spectral noise.

FIG. 1A shows an attempt, as undertaken in U.S. Pat. No. 7,248,618 B2, to increase the laser cavity selectivity via introducing a volume Bragg grating (VBG, marked 371 on the sketch) as the laser cavity end reflector. While reducing the spectral width of the laser output to a certain extent, this approach still does not provide a sufficient condition to allow single longitudinal mode operation for the SHG due to the cavity length spread between rear end of the laser active medium 370 and the VBG 371, the length required to place a nonlinear crystal and additional optical components inside the cavity.

FIG. 1B illustrates a condition for a single longitudinal mode operation by an example with reference to B. Jacobsson, V. Pasiskevicius, and F. Laurell, "Single-longitudinal mode Nd-laser with a Bragg-grating Fabry-Perot cavity", OPTICS EXPRESS, Vol. 14, No. 20, 9284-9292 (2006). To satisfy for a single longitudinal mode operation, the spectral interval where the VBG reflectivity $R_g(\lambda)$, that is close to 100% at its maximum and matches the active medium gain peak wavelength (shown as 1.0642 μm), remains higher than the value Ro (shown at level of 0.95) indicates the spectral width $\Delta\lambda_{Ro}$ within which, by an appropriate tuning, there should be present only one longitudinal mode of the laser cavity. In FIG. 1B the graph $Tc0(\lambda)$ as a function of the wavelength $\lambda$ shows the cavity longitudinal mode peaks separated by free spectrum range FSR. The value of FSR is invert proportional to the cavity optical path Lc and is given as $FSR=\lambda^2/2Lc$.

Ro is just a threshold value for the reflectivity of the laser cavity selective component that tolerates to switch the laser from a single longitudinal mode operation to a multi longitudinal mode regime. An actual value Ro depends on the active medium gain, cavity overall loss, and the pump power but in most practical cases is within 0.950.97. Thus, one can see that for a single longitudinal mode operation, the spectral width $\Delta\lambda_{RO}$ of laser cavity selectivity at Ro level must be just over or almost equal to the cavity FSR. In the cited example, proved experimentally, this corresponds to the maximum cavity length allowing for single longitudinal mode operation equal ≈4 mm. It is too short to accommodate an appropriate nonlinear crystal for an efficient SHG.

Figure 2:
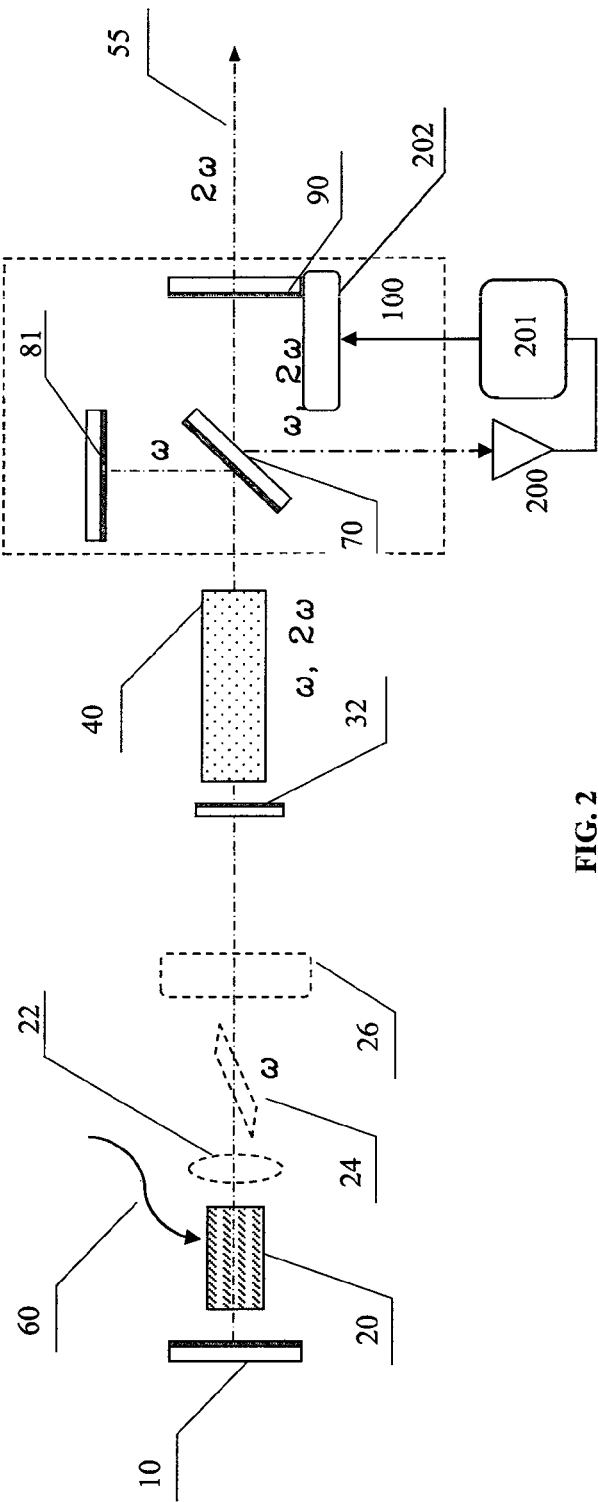
FIG. 2 shows a schematic view of a laser setup according to an embodiment of the present invention.

FIG. 2 shows an embodiment of the laser setup for intracavity SHG in accordance with the present invention. The setup comprises a linear type of laser cavity that is formed by the first (10) and the second (100) laser cavity end reflectors, an active medium 20, a SHG nonlinear crystal 40, and tuning means 200, 201, 202. The second cavity end reflector 100 in this embodiment comprises an interferometric layout that is configured as a Michelson interferometer with use of reflecting elements 81 and 90, both highly reflective about the laser fundamental frequency ω, and with beamsplitter 70, which is provided on one of its surfaces with a dielectric coating with reflectivity close to 50% about the laser fundamental frequency, furthermore the second surface of the beamsplitter is deposited with an anti-reflecting coating about the laser fundamental frequency (ω) and about the second harmonic frequency (2ω). The tuning means comprise a piezo-electric actuator (PZT) 202 to which the interferometer reflector 90 is attached to allow its fine movement and photo-electric feedback control loop comprising a photo-diode 200 that receives a small portion of the laser radiation being leaked from still little reflecting an AR-coating of an intracavity component (here this leakage shown, by way of example only, as being originated from the back surface of the interferometer beamsplitter 70), and an electronics circuits 201 that processes the signal from the photo-diode 200 and generates an electrical signal to control the PZT.

The waved arrow 60 indicates that an appropriate pumping means of the active medium 20 is provided. In particular, the suitable pumping means for the active medium make use of the radiation of one or more laser diodes with such radiation being delivered onto laser active medium via an appropriate optical arrangement that can also include an optical fiber.

Figure 2A:
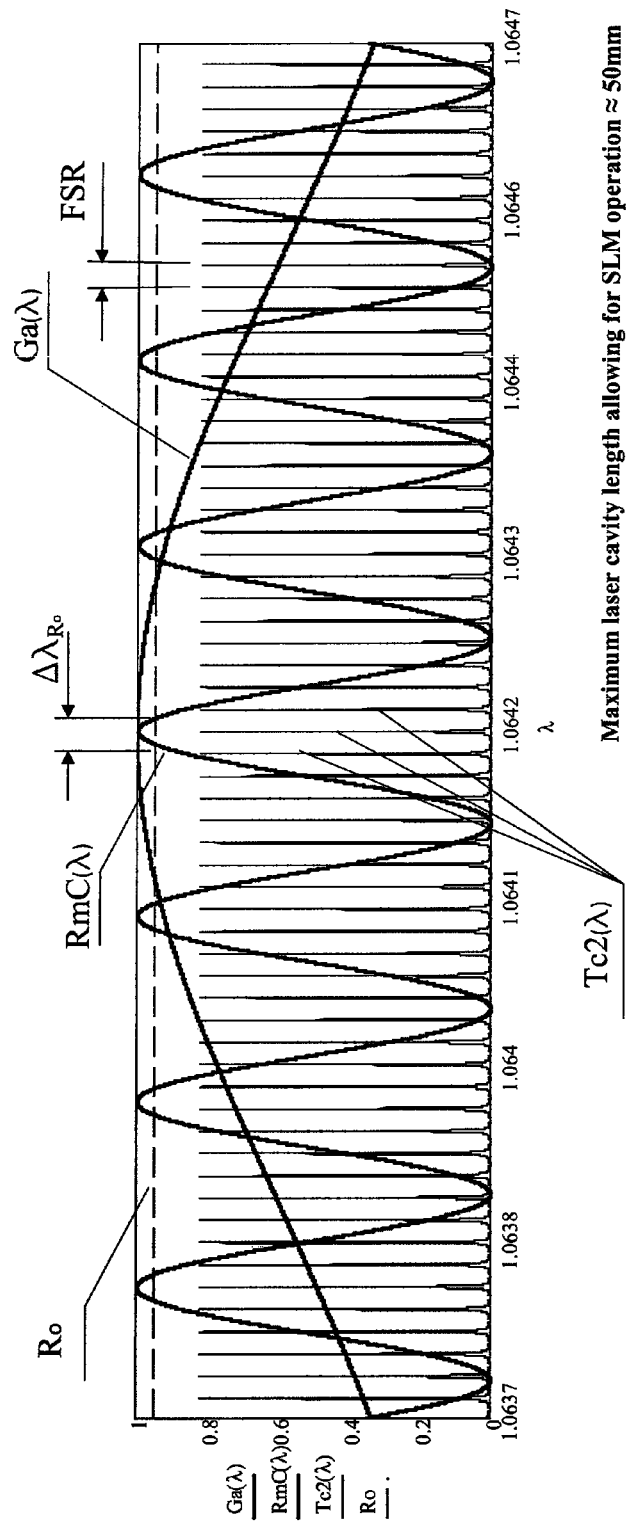
FIG. 2A illustrates the relation between the cavity longitudinal mode structure and the spectral selectivity of one of the laser cavity end reflectors for a single longitudinal mode operation according to an embodiment of the present invention of FIG. 2.

In the embodiment as shown in FIG. 2 the active medium can be a solid state laser material with relatively narrow gain bandwidth, for instance, a Neodymium doped laser crystal. For such a case FIG. 2A illustrates a relation between the laser medium gain spectrum $Ga(\lambda)$, the laser cavity longitudinal mode structure $Tc2(\lambda)$, and the spectral reflectivity $RmC(A)$ of the cavity end reflector that is configured as a Michelson interferometer. The optical path difference between two branches of the Michelson interferometer is chosen such that, from the first hand, only one reflectivity peak of the laser cavity end reflector occurs within spectral interval of the gain being higher its Ro level and, from the second hand, to narrow the spectral range $\Delta\lambda_{Ro}$ of this peak to be close to or almost equal to the RSR of the cavity. Here Ro is the threshold value of reflectivity that tolerates to switch the laser from a single longitudinal mode operation to a multi longitudinal mode regime. From FIG. 2A one can see that for this case the condition for single longitudinal mode operation of an intracavity SHG laser setup remains satisfied with cavity lengths up to ≈50 mm long.

In the embodiment as shown in FIG. 2 there can be a single or combined lens 22 provided into the laser cavity to form a desired transverse mode structure of the laser beam. The laser cavity can also incorporate polarization selective elements, for instance, Brewster plates 24 and/or cavity loss modulators 26 as used, for example, for Q-switching.

To arrange for uni-directional output of the generated second harmonic beam 2ω along the desired direction 55, in the embodiment of FIG. 2 the Michelson interferometer reflecting element 90 in addition to the reflectivity condition about the laser radiation at the fundamental frequency ω is also made highly transmitting at the second harmonic frequency 2ω, furthermore the laser cavity incorporates an additional mirror 32 that is highly transmitting about the laser fundamental frequency w and highly reflecting about the second harmonic frequency 2ω.

Figure 3:
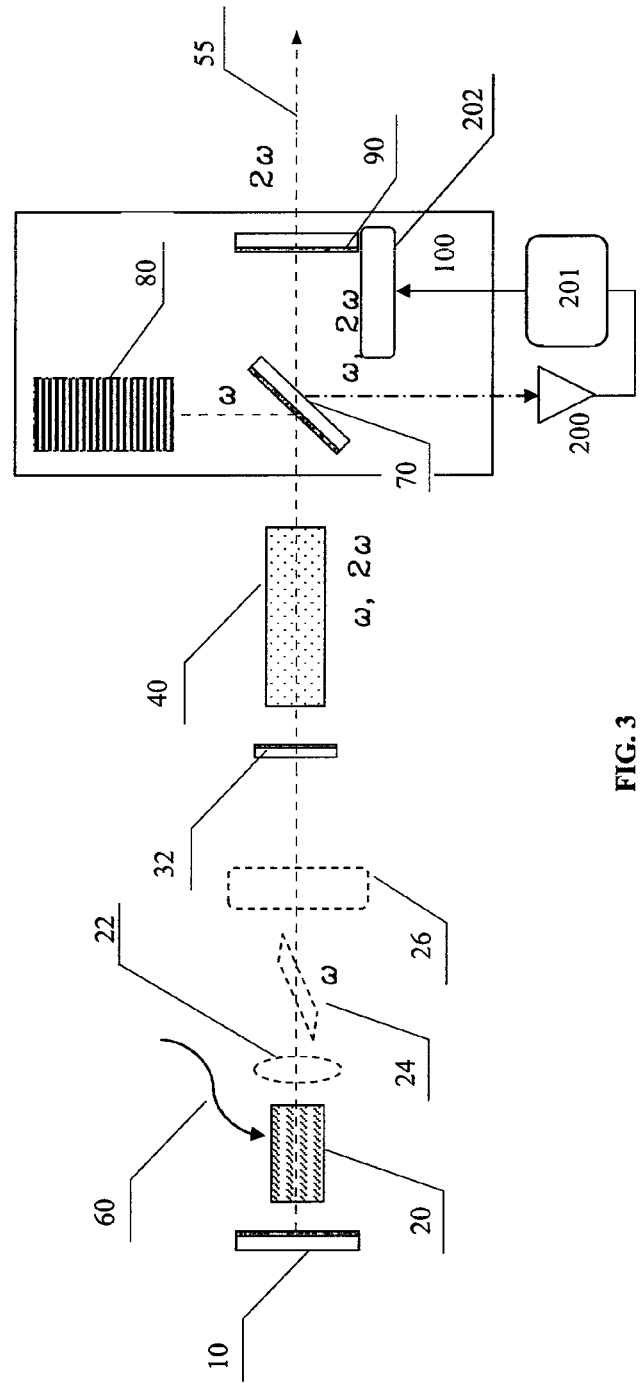
FIG. 3 shows a schematic view of a laser setup according to another embodiment of the present invention.

FIG. 3 shows an alternative embodiment of the present invention, wherein the interferometric layout 100 being configured as a Michelson interferometer to form one of laser cavity end reflectors uses as the second interferometer reflecting element 80 a volume Bragg grating (VBG) having its spectral peak reflectivity nearly to 100% about the laser fundamental frequency 2ω.

Figure 3A:
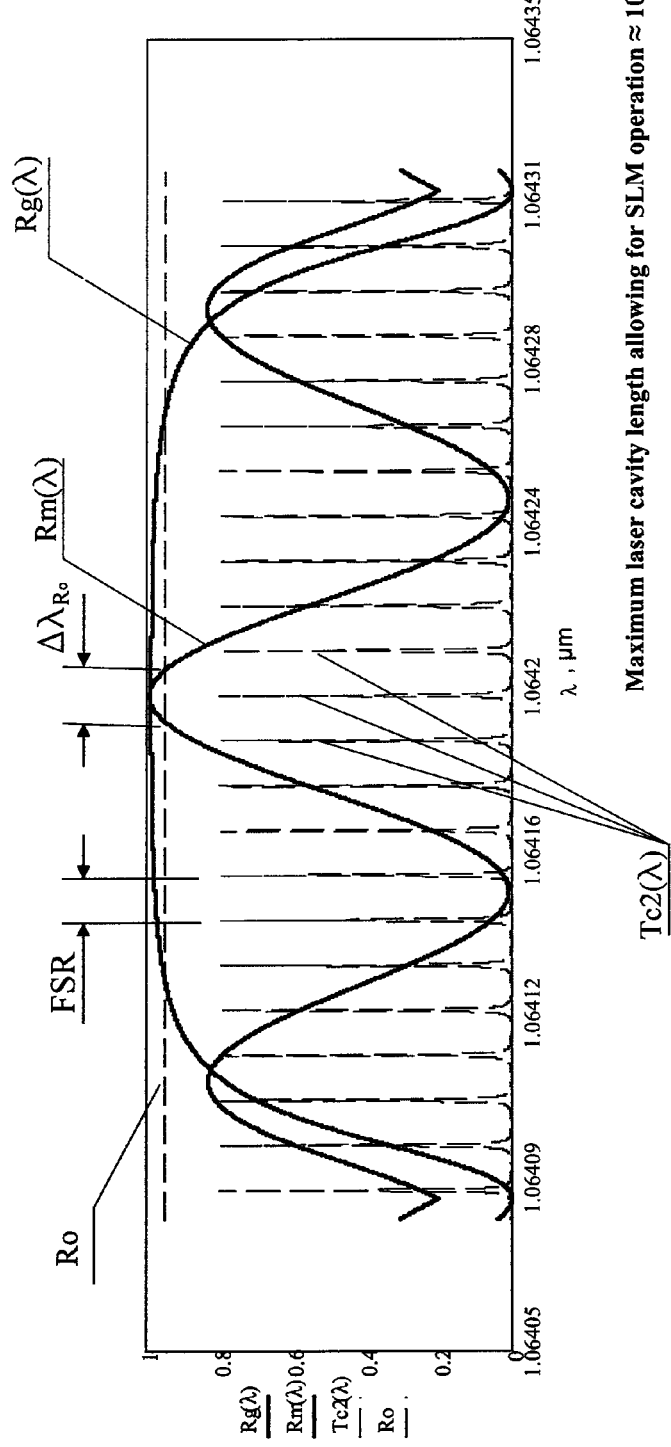
FIG. 3A illustrates the relation between the cavity longitudinal mode structure and the spectral selectivity of one of the laser cavity end reflectors for a single longitudinal mode operation according to an embodiment of the present invention as of FIG. 3.

FIG. 3A illustrates a relation between the VBG reflectivity spectrum $Rg(\lambda)$, the laser cavity longitudinal mode structure $Tc2(\lambda)$, and the spectral selectivity $Rm(A)$ of the cavity end reflector configured as a Michelson interferometer. One can see that for this case the spectral range value $\Delta\lambda_{Ro}$ is significantly narrower than corresponding value for VBG on its own. This makes condition for single longitudinal mode operation of an intracavity SHG laser setup satisfied with cavity length up to 100 mm long.

Figure 4:
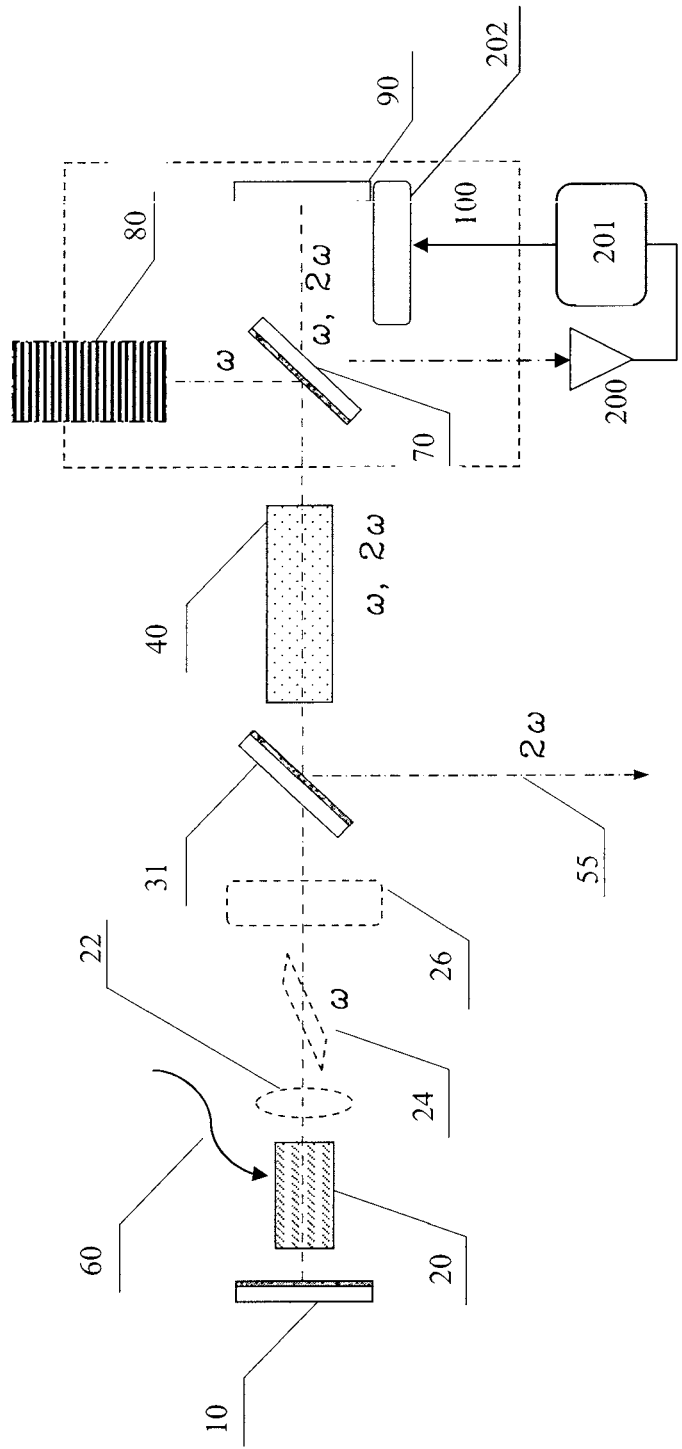
FIG. 4 shows a schematic view of a laser setup according to yet another embodiment of the present invention.
Figure 5:
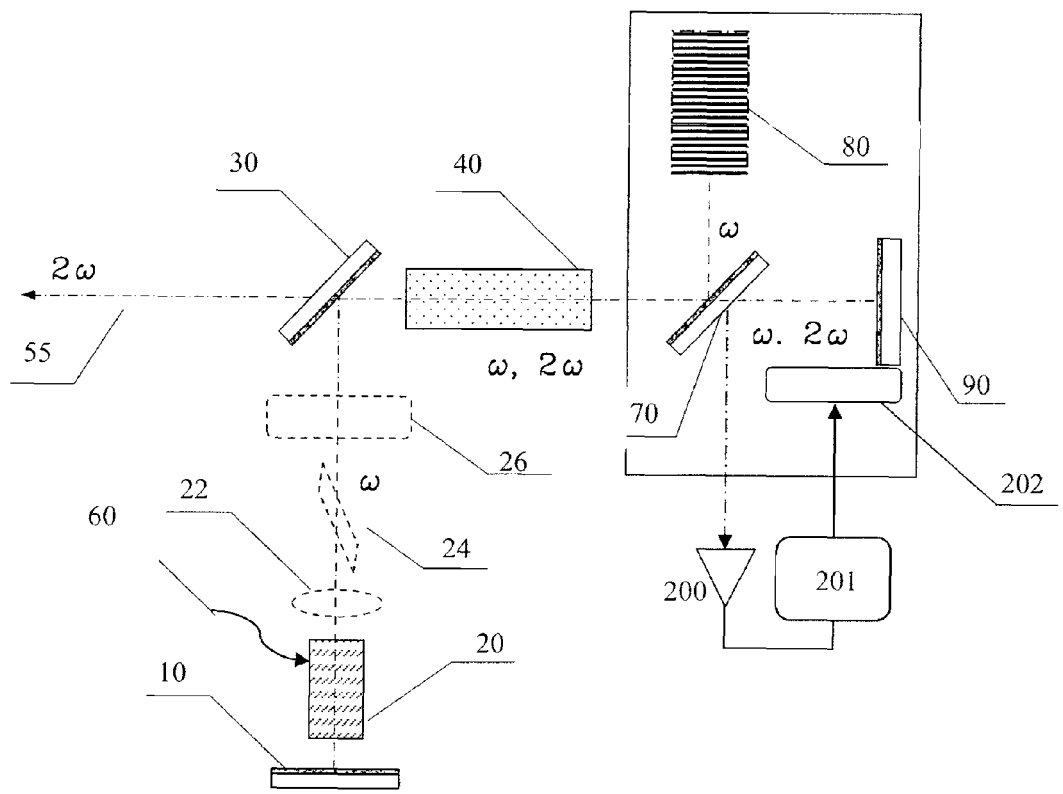
FIG. 5 shows a schematic view of a laser setup according to yet another embodiment of the present invention.

FIG. 4 and FIG. 5 show the modifications of the embodiment of FIG. 3 with concern to directing the laser output beam. The Michelson interferometer reflector 90 in these cases is highly reflective about both the laser fundamental frequency ω and the second harmonic frequency 2ω. For the embodiment as in FIG. 4 the laser cavity incorporates a spectrally selective beamsplitter 31, preferably but not restrictively tilted at 45 degrees, the said beamsplitter is provided on one of its surfaces with a dielectric coating being highly transmitting about the laser fundamental frequency ω and highly reflecting about the laser second harmonic frequency 2ω, furthermore the second surface of the said beamsplitter is deposited with an anti-reflecting coating about the laser fundamental frequency ω.

For the embodiment as in FIG. 5 the laser cavity incorporates a laser cavity folding mirror 30 that is highly reflecting about the laser fundamental frequency ω and highly transmitting about the laser second harmonic frequency 2ω.

Figure 6:
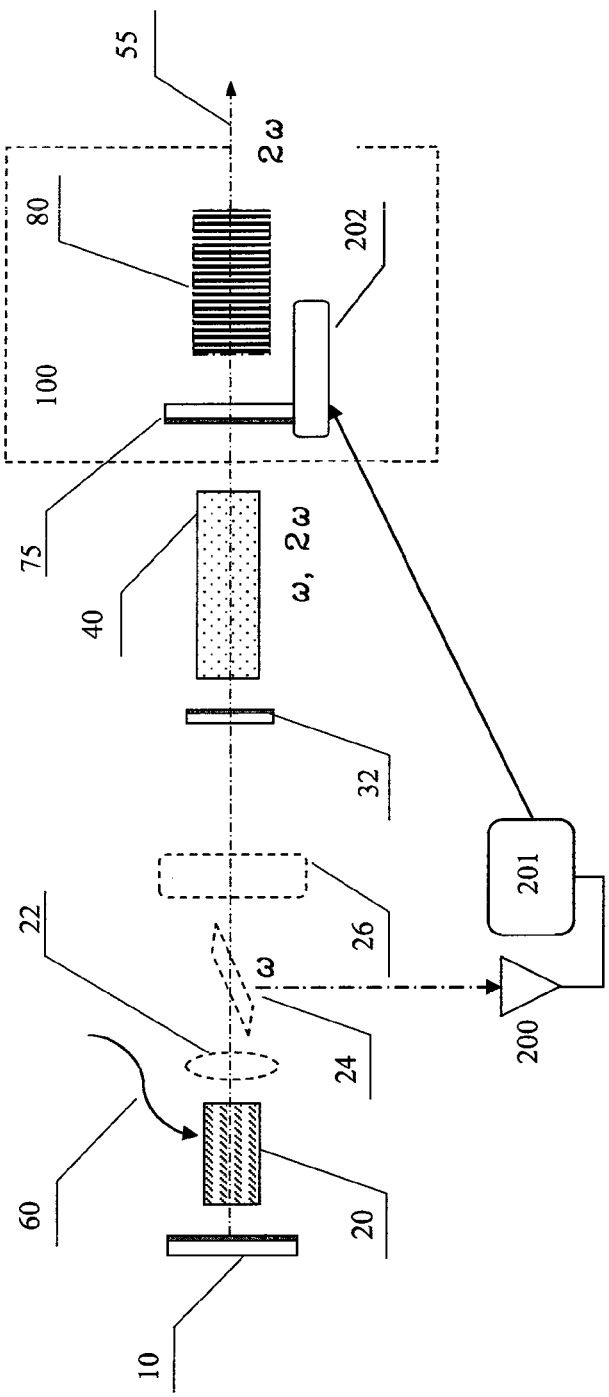
FIG. 6 shows a schematic view of a laser setup according to yet another embodiment of the present invention.
Figure 6:
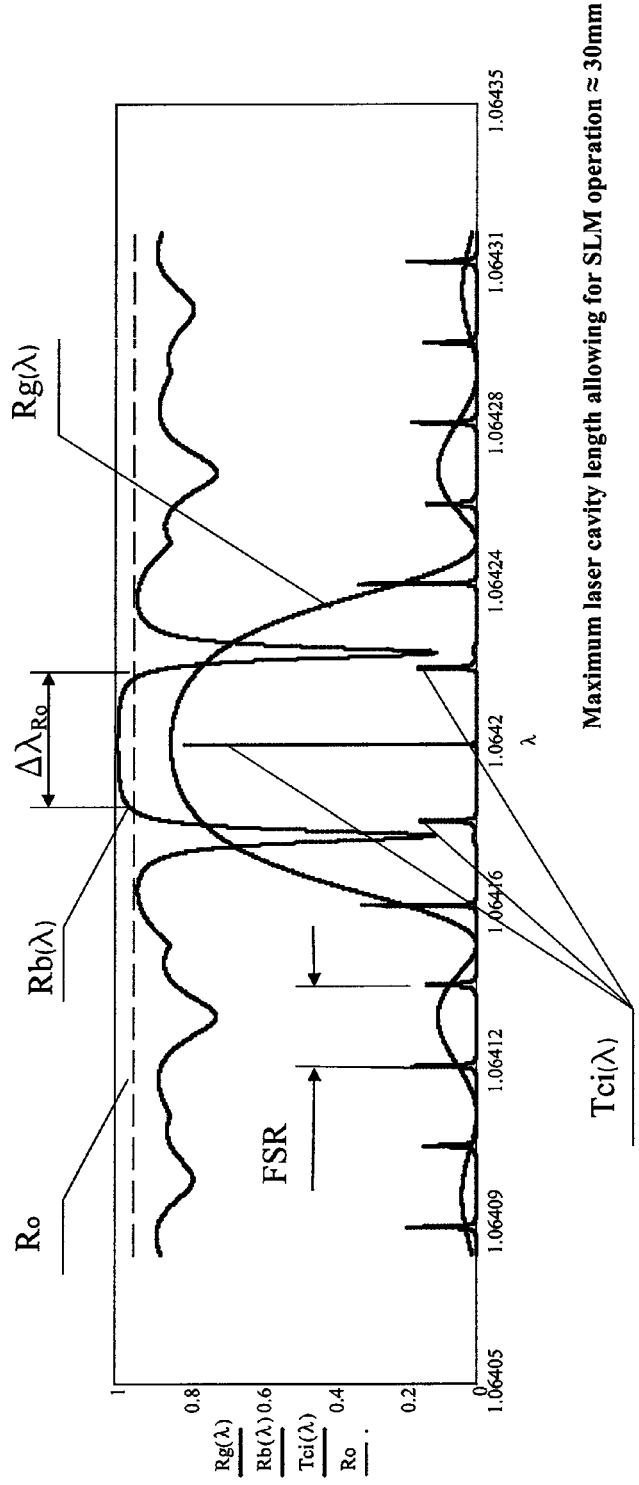

FIG. 6 shows another alternative embodiment of an intracavity SHG laser setup by the present invention. Here the interferometric layout 100 that forms at least one of the laser cavity end reflectors is configured as a Fabry-Perot interferometer at normal incidence, wherein the first Fabry-Perot interferometer reflecting element 75 is a multilayer dielectric mirror partially reflecting/transmitting about the laser fundamental frequency, the said dielectric mirror being deposited on one of the surfaces of an appropriate substrate, furthermore the second surface of the said substrate is provided with an anti-reflecting coating about the laser fundamental frequency ω and about the laser second harmonic frequency 2ω; the second Fabry-Perot interferometer reflecting element 85 is a volume Bragg grating (VBG) partially reflecting/transmitting at its spectral peak reflectivity about the laser fundamental frequency ω, furthermore the value of reflectivity of the first Fabry-Perot reflecting element 75 about the laser fundamental frequency ω is chosen close to the value of the spectral peak reflectivity of VBG 85. By a way of example only, the tuning means here is arranged that a photo-diode 200 receives a leaking radiation from a Brewster plate 24 and PZT actuator controls position of the first Fabry-Perot reflecting element 75.

For out-coupling the second harmonic radiation into a single direction from the Fabry-Perot interferometer laser cavity end, the interferometer reflecting element 75 in addition to the reflectivity condition about the laser radiation at the fundamental frequency ω is also made highly transmitting at the second harmonic frequency 2ω, and an additional mirror 32 inside the cavity is made highly transmitting about the laser fundamental frequency ω and highly reflecting about the second harmonic frequency 2ω.

FIG. 6A illustrates the relation between the VBG reflectivity spectrum Rg(λ), the laser cavity longitudinal mode structure Tci(λ), and the spectral selectivity Rb(λ) of the cavity end reflector configured as a Fabry-Perot interferometer at normal incidence. The condition for single longitudinal mode operation of an intracavity SHG laser setup in such an arrangement is satisfied with cavity length up to 30 mm long.

An additional advantage of the embodiments that incorporate a VBG grating as one of reflecting elements of the at least one of the laser cavity end reflectors is that the cavity selectivity spectral dependence has the only one peak that satisfies condition for a single longitudinal mode operation, presenting no restrictions with concern to the active medium choice. Hence, a broad gain material, for instance, Chromium doped laser crystal can be used as laser active medium, providing wide spectral coverage for single longitudinal mode operation within near IR, visible and UV spectrum range.

The skilled reader will appreciate that the invention is not limited to the specific implementations detailed above. The configurations discussed above are also suitable in more general sense for the intracavity frequency conversion processes, for example intracavity optical parametric oscillation (OPO), the third and forth harmonic generation, intracavity frequency shifting by Raman effect.

The invention claimed is:

1. A laser device for intra-cavity frequency conversion, in particular, for a second harmonic generation, the device comprising:
   a laser cavity, formed by a first laser cavity end reflector and a second laser cavity end reflector wherein said laser cavity end reflectors are highly reflective for a radiation about a laser fundamental frequency and as such provide for a predetermined level of circulating inside the cavity fundamental frequency power to effect a corresponding efficiency of non-linear frequency conversion;
   an active medium provided within the said laser cavity;
   at least one non-linear crystal, in particular, for the second harmonic generation provided within the same laser cavity;
   tuning means adapted for tuning at least one of laser cavity end reflectors;
   characterized in that
   at least one of the laser cavity end reflectors comprises an interferometric layout providing spectrally selective reflection for the radiation about the laser fundamental frequency with a value of reflectivity nearly to 100% within a spectral range close to a free spectrum range of the laser cavity and with a sufficiently lower reflectivity outside the above spectral range such that the laser cavity restricts a spectrum of the laser radiation to a single longitudinal mode.

2. A laser device as claimed in claim 1, wherein the interferometric layout forming at least one of the laser cavity end reflectors is configured as a Michelson interferometer, wherein the interferometer reflecting elements are multilayer dielectric mirrors highly reflective about the laser fundamental frequency, and a interferometer beamsplitter is provided on one of its surfaces with a dielectric coating with reflectivity close to 50% about the laser fundamental frequency, furthermore a second surface of the beamsplitter is deposited with an anti-reflecting coating about the laser fundamental frequency and about a second harmonic frequency.

3. A laser device as claimed in claim 1, wherein the interferometric layout forming at least one of the laser cavity end reflectors is configured as a Michelson interferometer, wherein one of the interferometer reflecting elements is a multilayer dielectric mirror highly reflective about the laser fundamental frequency, a second interferometer reflecting element is a volume Bragg grating having its spectral peak reflectivity nearly to 100% about the laser fundamental frequency, and a interferometer beamsplitter is provided on one of its surfaces with a dielectric coating with reflectivity close to 50% about the laser fundamental frequency, furthermore a second surface of the beamsplitter is deposited with an anti-reflecting coating about the laser fundamental frequency and about a second harmonic frequency.

4. A laser device as claimed in claim 2, wherein an optical path difference between two branches of the Michelson interferometer is chosen such as to narrow the spectral range of the nearly 100% reflectivity of the at least one of the laser cavity end reflector below its threshold value that tolerates to switch the laser from a single longitudinal mode operation to a multi longitudinal mode regime.

5. A laser device as claimed in claim 2, wherein for out-coupling the second harmonic radiation into a single direction from the laser cavity, the interferometer reflecting element in addition to a reflectivity condition about the laser radiation at the fundamental frequency is also made highly reflective at the second harmonic frequency, furthermore the laser cavity incorporates a laser cavity folding mirror, being highly reflecting about the laser fundamental frequency and highly transmitting about the laser second harmonic frequency.

6. A laser device as claimed in claim 2, wherein for out-coupling the second harmonic radiation into a single direction from the laser cavity, the interferometer reflecting element in addition to a reflectivity condition about the laser radiation at the fundamental frequency is also made highly reflective at the second harmonic frequency, furthermore the laser cavity incorporates a spectrally selective beamsplitter, preferably but not restrictively tilted at 45 degrees, the said beamsplitter is provided on one of its surfaces with a dielectric coating being highly transmitting about the laser fundamental frequency and highly reflecting about the laser second harmonic frequency, furthermore the second surface of the said beamsplitter is deposited with an anti-reflecting coating about the laser fundamental frequency.

7. A laser device as claimed in claim 2,
wherein for out-coupling the second harmonic radiation into a single direction from the Michelson interferometer laser cavity end, the interferometer reflecting element in addition to a reflectivity condition about the laser radiation at the fundamental frequency is also made highly transmitting at the second harmonic frequency, furthermore the laser cavity incorporates an additional mirror that is highly transmitting about the laser fundamental frequency and highly reflecting about the second harmonic frequency.

8. A laser device as claimed in claim 1,
wherein the interferometric layout forming at least one of the laser cavity end reflectors is configured as a Fabry-Perot interferometer at normal incidence, wherein a first Fabry-Perot interferometer reflecting element is a multilayer dielectric mirror partially reflecting/transmitting about the laser fundamental frequency, the said dielectric mirror being deposited on one of the surfaces of an appropriate substrate, furthermore a second surface of the said substrate is provided with an anti-reflecting coating about the laser fundamental frequency and about a laser second harmonic frequency; a second Fabry-Perot interferometer reflecting element is a volume Bragg grating partially reflecting/transmitting at its spectral peak reflectivity about the laser fundamental frequency, furthermore the value of reflectivity of the first Fabry-Perot reflecting element about the laser fundamental frequency is chosen close to a value of a spectral peak reflectivity of VBG.

9. A laser device as claimed in claim 8,
wherein the value of the spectral peak reflectivity of VBG and the value of the reflectivity of the first Fabry-Perot reflecting element about the laser fundamental frequency are chosen approximately within a range from 70% to 95%.

10. A laser device as claimed in claim 8,
wherein an optical path between the first Fabry-Perot reflecting element and the VBG is chosen such as to narrow the spectral range of the nearly 100% reflectivity of the at least one of the laser cavity end reflector below a spectral range threshold value that tolerates to switch from a single longitudinal mode operation to a multi longitudinal mode regime.

11. A laser device as claimed in claim 8, wherein for out-coupling a second harmonic radiation into a single direction from the laser cavity, the first Fabry-Perot interferometer reflecting element in addition to the reflectivity condition about the laser radiation at the fundamental frequency is also made highly reflective at the second harmonic frequency, furthermore the laser cavity incorporates a cavity folding mirror that is highly reflecting about the laser fundamental frequency and highly transmitting about the second harmonic frequency.

12. A laser device as claimed in claim 8,
wherein for out-coupling a second harmonic radiation into a single direction from the laser cavity, the first Fabry-Perot interferometer reflecting element in addition to a reflectivity condition about the laser radiation at the fundamental frequency is also made highly reflective at the second harmonic frequency, furthermore the laser cavity incorporates a spectrally selective beamsplitter, preferably but not restrictively tilted at 45 degrees, the said beamsplitter is provided on one of its surfaces with a dielectric coating being highly transmitting about the laser fundamental frequency and highly reflecting about the laser second harmonic frequency, furthermore a second surface of the said beamsplitter is deposited with an anti-reflecting coating about the laser fundamental frequency.

13. A laser device as claimed in claim 8,
wherein for out-coupling a second harmonic radiation into a single direction from a Fabry-Perot interferometer laser cavity end, the interferometer reflecting element in addition to the reflectivity condition about the laser radiation at the fundamental frequency is also made highly transmitting at the second harmonic frequency, furthermore the laser cavity incorporates an additional mirror that is highly transmitting about the laser fundamental frequency and highly reflecting about the second harmonic frequency.

14. A laser device as claimed in claim 1,
wherein the active medium is any suitable laser material.

15. A laser device as claimed in claim 14,
wherein a laser material is a solid state laser material that, being pumped or exited appropriately, is capable of amplifying and emitting radiation within a certain spectral range.

16. A laser device as claimed in claim 15,
wherein the solid state laser material is a Neodymium doped laser material, or Chromium doped laser material, or Erbium doped laser material, or Ytterbium doped laser material.

17. A laser device as claimed in claim 1,
wherein there is provided suitable pumping means for the active medium.

18. A laser device as claimed in claim 17,
wherein the suitable pumping means for the active medium make use of the radiation of one or more laser diodes with such radiation being delivered onto laser active medium via an appropriate optical arrangement that can also include an optical fiber.

19. A laser device as claimed in claim 1,
wherein the laser cavity incorporates a single or combined lens to form a desired transverse mode structure of a laser beam.

20. A laser device as claimed in claim 1,
wherein the laser cavity incorporates polarization selective elements, for instance, Brewster plates and/or cavity loss modulators as used, for example, for Q-switching.

21. A laser device as claimed in claim 1, wherein the at least one of the elements of the at least one of the laser cavity end reflectors comprising an interferometric layout is provided with a piezo-electric actuator for a fine tuning the laser cavity longitudinal mode structure and for stabilization of a laser output power via an appropriate photo-electric feedback control loop.

22. A laser device as claimed in claim 21,
wherein there is provided an appropriate second photo-electric feedback control loop with a second piezo-electric actuator to firmly lock the lasing single longitudinal mode frequency to a highly stable spectral position of the VBG selectivity peak, with a photo-electric feedback signal being originated by reflecting a small portion of the laser radiation at the fundamental frequency from the VBG end that is on an opposite side to the laser cavity, while a reflecting angle differs from a normal incidence but is still on a slope of the VBG spectral selectivity peak within its angular acceptance.

* * * * *